United States Patent [19]

Stewart

[11] Patent Number: 5,313,000
[45] Date of Patent: May 17, 1994

[54] POLYMERIZATION OF CYCLIC ETHERS

[75] Inventor: Malcolm J. Stewart, Bedford, England

[73] Assignee: The Secretary of State for Defence in her Britannic Majesty's Government of the U.K. of Britain and Northern Ireland, London, England

[21] Appl. No.: 820,692

[22] PCT Filed: May 30, 1990

[86] PCT No.: PCT/GB90/00837

§ 371 Date: Jan. 27, 1992

§ 102(e) Date: Jan. 27, 1992

[87] PCT Pub. No.: WO90/15092

PCT Pub. Date: Dec. 13, 1990

[30] Foreign Application Priority Data

May 31, 1989 [GB] United Kingdom ............... 8912456

[51] Int. Cl.$^5$ .................. C07C 31/18; C07C 201/00; C07C 41/03

[52] U.S. Cl. .................. 568/613; 568/614; 568/615; 568/620; 568/622; 568/623; 568/624; 558/483; 558/484; 558/485; 552/11; 528/408; 528/409; 528/417; 528/420; 528/421

[58] Field of Search ............... 568/613–615, 568/620, 622, 623, 624; 558/483, 484, 485; 528/408, 409, 417, 420, 421; 552/11

[56] References Cited

U.S. PATENT DOCUMENTS

| | | | |
|---|---|---|---|
| 3,305,565 | 2/1967 | Mueller | 260/348.6 |
| 4,110,268 | 8/1978 | Longley et al. | 521/177 |
| 4,393,199 | 7/1983 | Manser | 528/408 |

OTHER PUBLICATIONS

S. Penczek et al., Lecture at IUPAC 6th Int'l Symp. on Cationic Polymerization & Related Processes, Ghent, Aug. 1983, "Cationic Polymerization and Related Processes", E. J. Goethals Ed., Academic Press, 1984, pp. 139–154.

K. Brzezinska et al., Makromol. Chem., Rapid Commun., 7, pp. 1–4, (1986).

S. Penszek et al., Makromol. Chem., Marcomol. Symp., 3, pp. 203–217 (1986).

M. Bednarek et al., Makromol. Chem. Suppl., 15, pp. 49–60 (1989).

C. C. Gonzales et al., Makromol. Chem., 190, pp. 1217–1224 (1989).

Makromol. Chem., Rapdi Commun. 7, 1–4, (1986) Brezeziniska et al "Activated Monomer Mechanism in Cationic Polymerization, 1 Ethylene etc".

International Union of Pure and Applied Chemistry (Marco. Div.) 1984 pp. 145–147 Penczek et al "Cationic Polymerization and Related Processes".

Makromol. Chem., Macromol. Symp 6, 201–206 (1986) Wojtania et al Polymerization of Propylene Oxide by activated Monomer etc.

Primary Examiner—Marianne M. Cintins
Assistant Examiner—Michael B. Hydorn
Attorney, Agent, or Firm—Nixon & Vanderhye

[57] ABSTRACT

This invention relates to the production of hydroxy-terminated polymers in the 2,000–20,000 MW range suitable for use as prepolymers in curing reactions with isocyanates to produce elastomers. The process involves the continuous addition over periods of 25–50 hours of an oxirane (monoepoxide) or a mixture of an oxirane and an oxetane to a reaction mixture, consisting of stoichiometric excesses of oxonium ion-forming catalyst such as $BF_3$-etherate and a diol initiator dissolved in an inert solvent. Under these conditions, chain extension of the diol occurs and the formation of cyclic oligomers and other impurities is minimised. The mole ratio of the initiator to catalyst is maintained at above 10:1 to suppress the formation of cationic terminal species on the growing polymer chain.

14 Claims, No Drawings

POLYMERIZATION OF CYCLIC ETHERS

This invention relates to a process of polymerising cyclic ether monomers, especially oxiranes, capable of undergoing cationic oxonium ion ring-opening polymerisation. The invention further relates to certain hydroxy-terminated poly(alkylene ether) polymers produced by this process.

Cationic polymerisation of cyclic ethers by quasi-living chain extension is a well-known mechanism by which polymers can be prepared. In such polymerisation reactions, a cationic oxonium ion forms with acidic catalyst at the end of the chain which reacts with incoming monomer molecules. The incoming molecules then acquire this cationic reactivity as they bond to the chain end to promote further chain growth (ie propagation). These quasi-living chain polymerisation reactions are frequently "seeded" by an initiator compound, present in small quantities in the reaction mixture which may form an initial part of the propagating polymer chain. Chain growth can be controlled by quenching the reaction at the appropriate time with an appropriate terminating agent eg water to give hydroxyl terminal groups.

In theory, cationic quasi-living chain polymerisation of cyclic ethers produces high purity polymers of narrow polydispersity, and since all the chains within the reaction mixture would be expected to grow at approximately the same rate. In practice, however close control over chain growth is difficult to achieve because the highly reactive chain ends to the growing polymer chains will usually undergo rapid reaction with any available unreacted monomer. Furthermore, the basicity of the monomer strongly affects the mode of the reactions involved during chain growth, since various nucleophiles other than the monomer, such as the linear ether group in the polymer chain and the counter anion at the growing end, are also present in the reaction system. Thus, chain growth competes with various side reactions, and as a result, polydispersivity is broadened and the production of unwanted impurities increased.

These problems apply in particular to the cationic polymerisation of substituted oxiranes to produce hydroxy-terminated polyether prepolymers suitable for use in elastomer-forming cross-linking reaction with appropriate curing agents. Such polymerisations, conducted within chloroalkane solvents, have been described by Hammond et al (J Polymer Science 9 pp 265–279, 1971) who used small amounts (typically less than 2 mol %) of diols as initiators and protonic acids (specifically $BF_3$ etherate) as catalysts.

More recent attempts at producing poly(chloroalkylene) ethers by living chain polymerisation are disclosed in UK Patent Application GB 2021606A, which describes the reaction of chloroalkylene oxide monomers with an organic hydroxy-containing compound (typically a diol) in the presence of a catalyst system consisting of a fluorinated acid and a polyvalent organo-tin compound. Highly reactive oxonium ions which form at the chain ends during propagation readily react back into the polymer chain by attacking the oxo linking species to produce cyclic oligomers and short chain byproducts. These unwanted impurities can represent up to 50% contamination in the resultant prepolymer and can considerably broaden its polydispersivity, and as such seriously affect the cure of such prepolymers, the density of cross-links within the cured material, and hence its elastomeric properties.

Cyclic oligomer contamination can be reduced or even avoided in such polymerisation reactions, but only by deliberately choosing to produce polymers of low molecule weight. This is because it is usually found that the most common cyclic oligomer contaminants produced during the polymerisation of oxiranes are cyclic tetramers which occur in substantial amounts by the aforementioned back-reaction mechanism once the growing chain contains at least 5-6 alkylene oxide repeat units. By terminating chain growth before it reaches this size, the formation of these oligomers is avoided. However, this also effectively limits the maximum molecular weight of substantially oligomer-free polymer which can be produced from, for example, epichlorohydrin monomer and ethylene glycol precursor, to about 1000.

It has now been discovered that by adopting a new reaction protocol for polymerising cyclic ether monomers capable of cationic oxonium ion polymerisation, the molecular weight of the polymer products produced can be significantly increased whilst reducing oligomer contamination and polydispersivity.

Accordingly, the present invention provides in a first aspect a process for polymerising at least one cyclic ether monomer which is capable of cationic oxonium ion ring-opening polymerisation, comprising the steps of (a) reacting the monomer together with stoichiometric excesses of both a catalyst capable of generating an oxonium ion by reaction with the monomer, and an organic hydroxy-containing precursor compound for initiating polymerisation of the monomer, the precursor compound having at least one hydroxy group and being capable of undergoing chain extension polymerisation from its at least one hydroxy group with said oxonium ion, and (b) bringing further of the monomer into contact with the reaction mixture whilst maintaining the catalyst in stoichiometric excess over the monomer.

The organic hydroxyl compound is preferably polyfunctional having from 2 to 6 hydroxyl groups.

The present invention seeks to provide a process of polymerisation which is applicable to any cyclic ether monomer capable of cationic oxonium ion ring-opening polymerisation and yet by careful control of monomer and precursor concentration maintains a non-ionic hydroxyl terminal group, rather than a highly reactive terminal ionic species, on each growing polymer chain. The advantage of such a polymerisation is that without these ionic species the competing cyclic oligomer transfer process is substantially suppressed and so a virtually quantitative conversion of monomer to polymer then becomes possible. The process utilises a protonated monomer-catalyst species (i.e. the oxonium ion) as the reactive cationic species throughout polymerisation, so that the rate of chain growth can be carefully controlled by controlling the admission of monomer to the reaction mixture. In this way, a close control over polydispersivity can also be achieved.

Step (b) is preferably achieved by bringing the monomer into contact with the reaction mixture at a rate which is less than the rate of the chain extension reaction. Since catalyst is regenerated substantially quantitatively during polymerisation, this ensures that catalyst is always maintained in stoichiometric excess over monomer.

Each step (a) and (b) preferably comprises adding the monomer intermittently or, more preferably, continuously to the catalyst/precursor mixture to prevent the concentration of the monomer attaining high levels. Step (a) is completed when all functional hydroxy groups on the precursor have reacted with monomer molecules i.e. when at least f moles of monomer have been added per mole of precursor where f is the hydroxy functionality of the precursor. The period of addition during the steps (a) and (b) is preferably at least 10 hours, more preferably at least 15 hours, most preferably at least 20 hours to ensure that provided sufficient monomer is added in total, the polymeric product incorporates preferably at least 10, more preferably at least 15, monomer molecules per polymer chain.

The present process is especially applicable to cyclic ethers selected from the group oxiranes (olefine oxides, epoxides), oxetanes and less preferably tetrahydrofuran (THF), and can best be illustrated by reference to the homo-polymerisation of oxiranes which represent preferred monomers. An example of the general polymerisation protocol for these monomers in the presence of an acid catalyst and a hydroxy-containing organic compound (a diol) is given below in equations 1 to 4

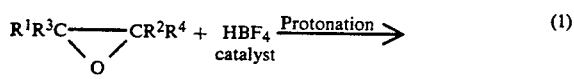 (1)

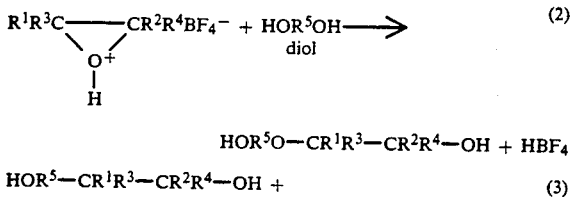 (2)

$$HOR^5O-CR^1R^3-CR^2R^4-OH + HBF_4$$

$$HOR^5-CR^1R^3-CR^2R^4-OH +$$ (3)

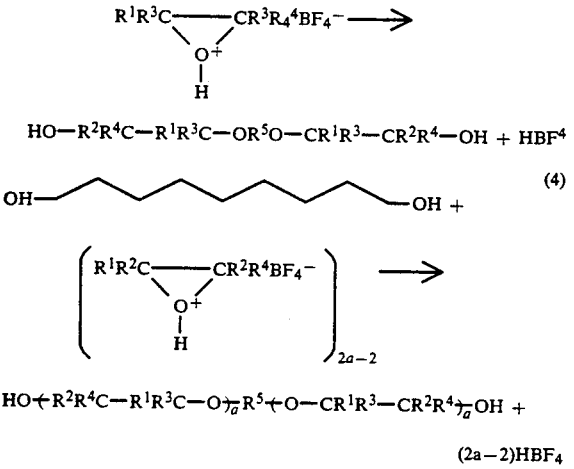

$$HO+R^2R^4C-R^1R^3C-O\overline{)_a}R^5+O-CR^1R^3-CR^2R^4\overline{)_a}OH +$$

(2a−2)HBF$_4$

In the oxirane used in equations 1 to 4 above, preferably $R^1$ and $R^2$ are independently selected from hydrogen and methyl, and $R^3$ and $R^4$ are independently selected from hydrogen, alkyl containing from 1 to 10 carbon atoms, chloroalkyl and bromoalkyl containing 1 to 2 carbon atoms, and nitratoalkyl, nitratoalkoxyalkyl, nitroalkyl, nitroalkoxyalkyl, azidoalkyl, azidoalkoxyalkyl, fluoronitroalkyl, and fluoronitroalkoxyalkyl containing 1 to 5 carbon atoms provided that at least one of $R^1$ to $R^4$ is not hydrogen. $R^4$ and $R^5$ will each preferably contain a maximum of 5 chlorine atoms, 5 bromine atoms, 2 nitro groups, 2 nitrato groups, 2 azido groups, and 2 fluoronitro (especially dinitrofluoro) groups depending on its identity. $R^5$ represents the organic residue, or core, of the diol.

The first step of the reaction (equation 1) involves the protonation of the oxirane, a step which also occurs in cationic quasi-living chain extension polymerisation. Since an excess of catalyst is present and protonation is rapid, conversion to a cationic oxirane-catalyst species (a secondary oxonium ion) takes place rapidly and the concentration of unreacted oxiranes tends to zero.

The simultaneous presence of excess diol, in the preferred ratio of at least 10 moles, more preferably at least 20 moles, of diol per mole of protonated monomer, promotes reactions (2) and (3) to form chain-extended non-ionic diols with the protonated monomer. These reactions regenerate catalyst which is then available for immediate reaction with any further monomer present in solution. Catalyst is released at the same rate as protonated monomer reacts with the extending chain, so that provided the rate of the polymerisation reaction exceeds the rate at which further monomer is brought into contact with the reaction mixture, then a stoichiometric excess of catalyst will always be present. In this way, conventional quasi-living chain cationic polymerisation, which relies upon the avaliability of unreacted, non-ionic monomer in excess over catalyst, is suppressed. Further chain extension of the diol by reaction (4) is achieved by maintaining a finite, but very low, concentration of monomer, which in practice is preferably attained by slowly and continuosly feeding fresh monomer into the reaction mixture.

A slow rate of addition is essential throughout polymerisation to prevent a cationic ring-opening reaction which may initiate a competing cationic quasi-living chain extension reaction. Since overall hydroxyl concentration in the reaction mixture falls as the reaction proceeds and polymer molecular weight increases, so the rate of the propagation reaction falls. If a constant, rather than a constantly decreasing, rate of oxirane addition is adopted, the rate of reaction during the final addition governs the maximum rate of addition used throughout. It also follows that since an infinite reaction time is impractical there is an upper limit to polymer molecular weight of approximately 20,000 which is equivalent to the incorporation of about 400 oxirane monomer units (i.e. a=about 200 at maximum).

It should be noted that in equation 4, rates of reaction on both sides of the diol core ($R^5$) have been assumed to be the same. In practice, some imbalance is likely in the number of monomer units incorporated either side of the core.

Termination of the polymerisation reaction (not shown in reactions 1 to 4) is effected by neutralising the protonic acid catalyst with, for example, a weak base such as sodium hydrogen carbonate. This leaves the polymer with hydroxyl functional terminal groups. Once recovered and dried, such polymers can therefore be used without further chemical modification in urethane-type curing reactions with, for example, diisocyanates.

The polymerisation of substituted oxiranes by the present process has been found to produce polymeric products which are substantially free of cyclic oligomer impurities. Furthermore, since reactions (2) and (3) with the diol are fast relative to reaction (4) with the growing polymer chain, the polydispersivity of the product tends to be narrow and is typically found to be as low as 1.3 for the crude product recovered from neutralisation of the reaction mixture. Known cationic quasi-living chain polymerisation involving oxiranes typically produces polymers of much broader polydispersivity of generally greater than 2 due in part to slower initiation of the polymer chain relative to its subsequent cationic propagation and also due in part to the presence of oligomers.

It has been found that period of time over which steps (a) and (b) (which preferably comprises continuously adding fresh monomer to the reaction mixture) are conducted depends principally upon the concentration of functional groups and catalyst within the reaction mixture. The homo- and copolymerisation of oxiranes has been found to require a reaction time of at least 10 hours and preferably at least 25 hours if significant polymer molecular weights in excess of 2500 are to be achieved. The most preferred addition times for oxiranes is in the range 30–200 hours, with shorter addition times being possible for lower molecular weight polymers and/or higher catalyst concentrations.

In order to promote rapid reaction with the hydroxyl-containing precursor during step (a) and to suppress the formation of cationic terminal species on the growing polymer chains, the molar ratio of precursor:protonic acid catalyst is preferably at least 2:f more preferably at least 5:f, most preferably at least 10:f. An upper limit of 100:f, more preferably 50:f, is preferred in order to obviate the need for very slow monomer addition rates.

The monomer may comprise a mixture of two or more types of cyclic ether each containing the same number of ether ring carbon atoms but different substituent groups, such as a mixture of two or more oxiranes. Alternatively it may comprise a mixture of different cyclic ethers containing different numbers of ring carbon atoms which when copolymerised form random copolymers with irregular distributions of ether linkages along the polymer chain, such as an oxirane mixed with an oxetane or THF. These latter copolymers possess several advantages, when cured to form elastomers, over their homopolymer analogues in that invariably glass transition temperature is lowered due to their more irregular structure to produce better elastomeric properties. By varying the ratio of cyclic ethers in the monomer mixture it therefore becomes possible to tailor the properties of the polymer to particular applications. However, it has been found that oligomer contamination tends to increase with decreasing oxirane content in the mixture. For this reason the mixture preferably contains at least 10 mole %, preferably at least 20 mole %, of substituted oxirane.

Different cyclic ether monomers may also be added to the reaction mixture in sequence, especially during step (b), to promote the formation of block copolymers.

The polymerisation reaction is preferably conducted under anhydrous conditions in an inert organic solvent which serves as a diluent for the various reactants. Toluene is the preferred solvent for the copolymerisation of substituted oxiranes with other cyclic ethers. Chlorinate hydrocarbon solvents, especially $C_1$–$C_2$ chloroalkanes such as dichloromethane, are preferred for the homopolymerisation of oxiranes and the copolymerisation of oxiranes with other cyclic ethers. This latter finding is particularly advantageous when the monomer is a nitratoalkyl-substituted oxirane since these can be directly prepared in such chloroalkane solvents in high yield and purity by reaction between hydroxyalkyl-substituted oxiranes and dinitrogen pentoxide. Such methods of preparation are disclosed in Applicant's UK Patent Applications 8817545 and 8907852, which correspond to Applicant's later PCT Patent Applications publication numbers WO90/01029 and WO90/01028 respectively. The latter Application 8907852 also discloses that nitratoalkyl-substituted oxetanes can be prepared in the same solvents and by the same method, using hydroxyalkyl-substituted oxetanes as reagents. The use of these methods has the advantage that the hazardous nitrated monomer need not be isolated from its inert carrier before use in the present process.

The present polymerisation involving oxiranes is preferably conducted within the temperature range $-10°$ C. to $+50°$ C. for both homo- and copolymerisation, with $+10°$ C. to $+30°$ C. being most preferred. Generally, an increase in reaction temperature decreases monomer addition time, but on exceeding 40° C. undefined side reactions are found to occur in significant amounts which tend to broaden polydispersivity.

Preferred alkyl-substituted oxiranes which may be used in the present process include 1,2-epoxypropane, 2,3-epoxypentane, and 1,2-epoxyhexane.

Preferred chloroalkyl- and bromoalkyl-substituted oxiranes include epichlorohydrin, epibromohydrin, 1-chloro-2-methyl-2,3-epoxypropane, and 1-chloro-2,3-dimethyl-2,3-epoxy-butane, 1,1-dichloro-2,3-epoxypropane, 1,1,1-trichloro-2,3-epoxypropane, 1-bromo-1,1-dichloro-2,3-epoxypropane, 1,1-dichloro-1-fluoro-2,3-epoxypropane, 1,1-difluoro-1-chloro-2,3-epoxypropane, 1,1-dichloro-2-methyl-2,3-epoxypropane, 1,1,1,-trichloro-3,4-epoxybutane, 1,1-dichloro-3,4-epoxybutane, 1,1,1,2,2-pentachloro-3,4-epoxybutane, 1,1,1,4,4-pentachloro-2,3-epoxybutane, 1,1,1,2,2-mixed pentahalo-3,4-epoxybutane, and 1,1,1,2,2-pentachloro-2-methyl-2,3-epoxybutane, 1,1,4,4-tetrachloro-2,3-epoxybutane, 1,1,2,2-tetrachloro-3,4-epoxybutane and 1,1,1,2-tetrachloro-3,4-epoxybutane.

Preferred nitratoalkyl-substituted oxiranes include glycidyl nitrate and 1,2-epoxy-4-nitratobutane. Preferred fluoronitro-substituted oxiranes include fluorodinitroglycidyl ether.

Other oxiranes which may also be used in the present process include cyclohexane oxide and styrene oxide, though if present they preferably represent less than 50 mol % of the total oxirane content of the monomer.

Preferred oxetanes which may be used in the present process to form highly energetic copolymers with oxiranes containing energetic nitro, azido, fluoronitro and (in particular) nitrato groups, are nitratoalkyl-substituted oxetanes such as 3,3-bisnitratomethyloxetane, 3-nitratomethyl-3-methyloxetane, 3-nitratomethyl-3-ethyloxetane, and 3-nitratomethyl-3-chloromethyloxetane, nitroalkoxyalkyl-substituted oxetanes such as 3-(2,2-dinitropropoxymethyl)-3-methyl oxetane, fluoronitroalkoxyalkyl-substituted oxetanes such as 3-(2-fluoro-2,2-dinitroethoxymethyl)-3-methyl oxetanes, and azidoalkyl-substituted oxiranes such as 3,3-bis(azidomethyl)-oxetane. The substituent groups in these substituted oxetanes preferably contain up to 5 carbon atoms.

The hydroxyl-containing organic materials used in the present process for homopolymerising and copolymerising oxiranes include liquid and solid organic materials which have a hydroxyl functionality of at least one, and preferably from 2 to 6, most preferably 2 or 3. These materials may be monomeric or polymeric and are preferably selected from monomeric and polymeric polyols (i.e. containing at least 2 hydroxyl groups per molecule). The number of polymeric chains which propagate from the hydroxyl-containing material acting as the precursor will generally be equal to its functionality.

The hydroxy groups of the organic materials may be terminal or pendant groups. Hydroxyl-containing materials containing both terminal and pendant hydroxyl groups may also be used. The molecular weight of the organic hydroxyl-containing material may be in the range of from 34 to about 2,500.

Preferably, the organic hydroxyl-containing material is an aliphatic material which contains at least one primary or secondary aliphatic hydroxyl group (i.e. the hydroxyl group is bonded directly to a non-aromatic carbon atom). Most preferably said organic material is an alkane polyol.

Monomeric alcohols and polyols which may be used include methanol, ethanol, isopropanol, 2-butanol, 1-octanol, octadecanol, 3-methyl-2-butanol, 5-propyl-3-hexanol, cyclohexanol, ethylene glycol, propylene glycol, 1,3-butanediol, 1,4-butanediol, 1,6-hexanediol, 1,4-cyclohexanedimethanol, glycerol, tetramethylene glycol, 1,2,6-hexanetiol, 1,1,1-timethylolpropane, pentaerythritol, 2-hydroxy-2-ethylpropane-1,2 diol, tris(hydroxymethyl)nitromethane, and sorbitol, and further include, especially when one of $R^3$ and $R^4$ is a chloroalkyl group, 2-chloroethanol, 3-chloropropanol, 2,3-dichloropropanol, 3,4-dibromo-1,2-butanediol, 2,3-dibromo-1,4-butanediol, 1,2,5,6-tetrabromohexane-3,4-diol.

Polymeric polyols which may be used include polyoxyethylene and polyoxypropylene glycols and triols of molecular weights from about 200 to about 2000, hydroxy-terminated polyalkadienes, and polytetramethylene glycols of varying molecular weight.

The catalysts employed in the present process are either compounds already prepared or compounds formed in situ with for example ethers. Such compounds are normally defined as protonic acids. For example they may comprise inorganic protonic acids such as $HClO_4$, $HSO_3F$, $HSO_3Cl$, $H_2SnCl_6$, $HIO_3$, $HSbCl_6$ or $HFeCl_4$ and, more preferably, fluorinated acids selected from bis(fluorinated aliphatic sulphonyl) alkanes and from acids of formula $HXF_n$ where X is boron, phosphorus, arsenic or antimony and n is 3 where X is boron and 5 where X is phosphorus, antimony or arsenic, or they may comprise already prepared trialkyloxonium salts such as $[(C_2H_5)_3O]SbCl_6$, $[(C_2H_5)_3O]BF_4$, $[(C_2H_5)_3O]FeCl_4$ and $[(C_2H_5)_3O]AlCl_4$. They may also comprise Lewis acids which form suitable catalysts in situ, such as $AlCl_3$, $SnCl_4$, $SbCl_5$, $FeCl_3$ and, more preferably, fluorinated Lewis acids of formula $XF_{n-1}$ where X and n are as defined above. Examples of suitable bis(fluorinated aliphatic sulphonyl) alkanes, which are preferably bis(-perfluoroalkylsulphonyl)alkanes, are bis(trifluoromethylsulphonyl)methane and bis(difluorochloromethylsulphonyl)methane. Other examples may be found in UK Patent Application GB 2021606A and U.S. Pat. Nos. 3,632,843; 3,704,311; 3,701,408; 3,776,960 and 3,794,687. Suitable acids of formula $HXF_n$ and $XF_{n-1}$ are $BF_3$, $HBF_4$, $PF_5$, $HPF_6$, $SbF_5$, $HSbF_6$, $AsF_5$, and $HAsF_6$.

The products of the present process derived from the homopolymerisation and copolymerisation of substituted oxiranes, as exemplified by the product of equation (4) above, are new. According to a further aspect of the present invention, therefore, there is provided a hydroxy-terminated poly(alkylethers) homopolymer or random copolymer of formula

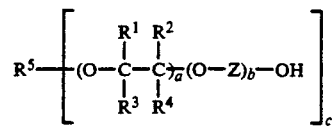

wherein
$R^1$ and $R^2$ are independently selected from hydrogen and methyl;
$R^3$ and $R^4$ are independently selected from hydrogen, alkyl containing from 1 to 10 carbon atoms, chloroalkyl and bromoalkyl containing 1 to 2 carbon atoms, and nitratoalkyl, nitratoalkoxyalkyl, nitroalkyl, nitroalkoxyalkyl, azidoalkyl, azidoalkoxyalkyl, fluoronitroalkyl, and fluoronitroalkoxyalkyl containing 1 to 5 carbon atoms provided that at least one of $R^1$ to
$R^4$ is not hydrogen;
Z is an optionally-substituted alkylene group containing at least three bridging carbon atoms;
a is an integer from 1 to 200;
b is zero or an integer from 1 to 199, preferably from 1 to 180; (a+b) is at least 10 and, preferably, the ratio of a to b is at least 1:9;
$R^5$ is a residue of an organic hydroxy material which material originally contained from 1 to 6 hydroxyl groups; and
c is an integer from 1 to 6.

The molecular weight of the poly(alkylether) will generally lie within the range 2500 to 20,000 and will preferably contain between 20 and 150, more preferably between 50 and 100, substituted oxyethylene repeat units in each polymeric chain. The hydroxy-containing organic material from which the residue $R^5$ is derived, is preferably diol or triol to ensure the polymer can be used as an elastomer prepolymer and yet does not possess too great a functionality for such use, and may be any of those listed above. The species —(—O—Z—)— is preferably derived from a cyclic ether other than an oxirane, especially THF or an oxetane.

At least one of $R_3$ and $R_4$ is preferably selected form azidoalkyl and nitratoalkyl. These groups are generally attacked by alkali catalysts and so poly(alkylethers) containing such groups cannot normally be made by anionic polymerisation involving the use of these catalysts.

In a yet further aspect of the present invention, there is provided a hydroxy-terminated poly(alkylether) homopolymer of formula

wherein
$R^5$ and c are as defined above,
—(O—Z)— is a substituted oxyalkylene group containing three bridging carbon atoms, which is derived from either a nitroalkyl-substituted oxetane or an azidoalkyl-substituted oxetane, and b is an integer from 5 to 200, preferably from 10 to 150.

The present invention will now be described by way of example only.

A. THE POLYMERISATION OF GLYCIDYL NITRATE (GLYN)

Safety Note: Owing to the explosion hazard associated with glycidyl nitrate monomer and polymer the polymerisation and copolymerisation reactions should be undertaken in an armoured fume cupboard.

Example 1

The preparation of difunctional polyglycidyl nitrate

The polymerisation reactor which consisted of a 500 ml jacketed vessel equipped with magnetic stirrer, nitrogen inlet/outlet, thermometer and serum cap was cooled from 120° C. to ambient under nitrogen. It was then connected, to a cooling circulator and charged with a 25% w/v mixture of butane-1,4-diol in dichloromethane (1.5 g in 5 ml, 0.0168 mol). The reactor was then thermostatted under nitrogen to 20° C. and a catalytic amount of tetrafluoroboric acid etherate —(HBF$_4$.Et$_2$O)— (0.28 g, 0.00168 mol) was added dropwise over a period of 3 minutes. Immediately afterwards a dried 25% w/v GLYN in dichloromethane solution (100 g GLYN in 400 ml dichloromethane), prepared by the method of Example 1 of the Applicant's pending UK Patent Application 8907852, corresponding to published PCT Patent Application WO90/01028, was pumped in at constant flow rate over a period of 42 hours. When addition was complete a further reaction period of 2 hours was allowed before the reaction was terminated by addition of a large excess of sodium hydrogen carbonate solution. The polymer was then isolated by washing the organic layer with distilled water, drying over calcium chloride, then removing the solvent on a rotary evaporator. The resultant tacky polymer was then dried at 50° C. for 60 hours in a vacuum oven. Yield 99 g (99%). The crude product was shown to possess no oligomer and about 1% small molecule impurities by $^1$H and $^{13}$C nmr along with dual detector gel permeation chromatography. Overall conversion to high polymer thus exceeded 98% isolated. The molecular weight of the polymer was: $M_n=4900$, $M_w=6900$ giving a polydispersivity ($M_w/M_n$) of 1.39.

Example 2

The Preparation of Difunctional Polyglycidyl Nitrate (Variation)

The procedure followed that outlined in Example 1 above except that HSbF$_6$ was used in place of HBF$_4$. Yield was 99% with approximately 1% small molecule impurities present. The molecular weight of the polymer was: $M_n=5150$, $M_w=6900$ giving a polydispersivity of 1.34.

Example 3

The Preparation of Difunctional Polyglycidyl Nitrate (variation)

The procedure followed that outlined in Example 1 above except that BF$_3$ etherate was used in place of HBF$_4$. Addition of monomer was delayed 1 hour in order to allow the initiatory complex to form, whereupon it was added over a 48 hour period. Yield was 98% with approximately 1% small molecule impurities present. The molecular weight of the polymer was: $M_n=4700$, $M_w=7150$ giving a polydispersivity of 1.52.

Example 4

The Preparation of Difunctional Polyglycidyl Nitrate (variation)

The procedure followed that outlined in Example 3 above except that a catalytic amount of BF$_3$ etherate was coreacted with an equimolar amount of ethanol over a 30 minute period then used in place of the HBF$_4$ of Example 1. Addition of monomer was not delayed and the monomer was added over a 48 hour period. Yield was again 99% with approximately 1% small impurities present. The molecular weight of the polymer was: $M_n=5100$, $M_w=7300$ giving a polydispersivity of 1.43.

Examples 5-8

The Preparation of Difunctional Polyglycidyl Nitrate (variations)

These procedures followed the method of Example 1 above except that ethane-1,2-diol, trimethylene glycol, tetraethylene glycol, and nominal 1000 molecular weight polyethylene glycol (PEG) were used in place of the butane-1,4-diol. In all cases yield exceeded 97% and small molecular contamination did not exceed 2%. The molecular weights were all within the range: $M_n=5400-4650$, $M_w=8000-6500$ giving polydispersivities in the range 1.4 to 1.7. The highest polydispersivity ($M_w/M_n$) value of 1.69 was obtained when 1000 molecular weight PEG was used as initiator. Other $M_w/M_n$ values were in the range 1.4 to 1.60.

Examples 9-12

The Preparation of Trifunctional Polyglycidyl Nitrate

These procedures followed the methods of Examples 1-4 except that metriol replaced butane-1,2-diol in equimolar amounts and a slightly larger amount of catalytic HBF$_4$ (0.42 g, 0.00525 mol) was used. Addition was again over a 42-48 hour period. Isolated yield were 98% and this material was uncontaminated with oligomers and small molecular contaminants. The molecular weights of the polymeric products were all within the approximate range: $M_n=5900-5100$, $M_w=8800-7600$ giving polydispersivities in the range 1.45-1.65.

Examples 13-14

The Preparation of Trifunctional Polyglycidyl Nitrate (Variations)

These procedures followed the method of Example 9 except that 2-hydroxyl-2-ethylpropane-1,2-diol and tris(hydroxymethyl)nitromethane were used instead of metriol. The molecular weight of the polymeric product of Example 13 was: $M_n=5600$, $M_w=8700$ giving a polydispersivity of 1.62. The molecular weight of the polymeric product of Example 14 was: $M_n=5000$, $M_w=7200$ giving a polydispersivity of 1.45.

B. THE POLYMERISATION OF EPICHLOROHYDRIN

Examples 15-22

The Preparation of Di- and Trifunctional Polyepichlorohydrins

These procedures followed the methods of Examples 1-4 and 9-12, except that an equimolar amount of epichlorohydrin was used instead of glycidyl nitrate and a 30 hour addition period was used. The lowest isolated yield recorded was 98% and no monomer or oligomer was observed in any sample. The molecular weights of the polymeric products were all within the range: $M_n=5200-4000$, $M_w=7000-5800$ giving polydispersivity in the range of 1.30 to 1.70.

Example 23

The Preparation of Difunctional Polyepichlorohydrin (Variation)

The procedure followed the method of Example 1 except that an equimolar amount of epichlorohydrin was used and the addition period (of epichlorohydrin to the diol solution) was only 6 hours. The isolated yield of polymer was 97%, of which 7% was found to be cyclic oligomer contamination. These impurities were removed by precipitation into an 80:20 methanol:water mixture to give 99% pure polymer of nominally 2,000 molecular weight in 82% overall yield.

C. THE POLYMERISATION OF PROPYLENE OXIDE

Examples 24–25

The Preparation of Di- and Trifunctional Polypropylene Oxides

These procedures followed the methods of Examples 1 and 9 except that a 24 hour propylene oxide addition period was used. The molecular weight of the polymeric product of Example 24 was: $M_n=4200$, $M_w=5300$ giving a polydispersivity of 1.27. The molecular weight of the polymeric product of Example 25 was: $M_n=4400$, $M_w=6100$ giving a polydispersivity of 1.39.

D. THE COPOLYMERISATION OF GLYCIDYL NITRATE AND 3-NITRATOMETHYL-3-METHYLOXETANE (NIMMO)

Example 26

The Preparation of poly(GLYN:NIMMO) Random Copolymer (50:50)

This procedure followed the same outline procedure as in Example 1 above except that the monomer feed consisted of a 50:50 mixture of GLYN and NIMMO in dichloromethane. Reaction time was 48 hours at 25° C. The resultant copolymer was recovered in 94% yield and was found to be contaminated with oligomer 12% and unreacted monomer 2%. These impurities were easily removed by precipitation into a 80:20 methanol:water mixture to give pure copolymer in 76% overall yield. The molecular weight of the copolymer was: $M_n=4200$, $M_w=9600$ giving a polydispersivity of 2.28.

Examples 27–32

The Preparation of poly(GLYN-NIMMO) Random Copolymers (Variations)

These procedures followed that outlined in Example 26 above except that monomer molar ratios of 80:20, 70:30, 60:40, 40:60, 30:70, and 20:80 (GLYN:NIMMO) were used. Typically as the amount of NIMMO present in the reaction mixture rose so did the amount of oligomer contamination. Thus at 80:20 overall yield was 96% and 7% oligomer contamination was present, whereas at 20:80 overall yield was 92% and this contained 19% oligomer.

Example 33

The Preparation of poly(Epichlorohydrin-THF) Random Copolymer (Variation)

This procedure followed that outlined in Example 26 except that the monomer feed consisted of a 50:50 mixture of neat epichlorohydrin and THF (tetrahydrofuran). The solution was added over 40 hours at 0° C. to yield the copolymer in 87% yield. This was contaminated with 17% oligomer.

Example 34

The Preparation of Difunctional Polyoxetane

The polymerisation reactor which consisted of a 500 ml jacketed vessel, equipped with magnetic stener, nitrogen inlet/outlet and serum cup was connected to a circulating bath. It was then charged with a 25% W/v mixture of butane-1,4-diol in dichloromethane (1.55 g in 5 mls, 0.017 mol). The reaction was thermostatted under nitrogen at 30° C. and a catalytic amount of tetrafluoroboric acid etherate (HBF$_4$.0Et$_2$) (0.29 g 0.0017 mol) added. Immediately afterwards a dried 20% w/v oxetane solution in dichloromethane (20 g oxetane in 100 ml dichloromethane, 0.34 mol) was pumped in at constant flow for a period of 16 hours. When addition was complete a further reaction period of 4 hours was allowed before the reaction was terminated by addition of a 2 fold excess of aqueous sodium hydrogen carbonate. The polymer was then isolated by washing with water, drying the dichloromethane solution with calcium chloride and removing the solvent on a rotary evaporator. The resultant amorphous polymer was then dried at 50° C. for 72 hours in a vacuum oven. Yield 19 g (95%). The crude product was shown to possess less than 2% oligomer impurity by use of dual detector gpc. The molecular weight of this polymer was $M_n=1200$, $M_w=1450$, $M_w/M_n=1.20$

Example 35

The Preparation of Difunctional Polyoxetane (Variation)

As Example 34 except that 50 g (0.34 mol) of 3-Nitratomethyl-3-methyloxetane (NIMMO) was used in place of oxetane. Yield was 49 g, (98%) with 4% oligomer present. The molecular weight of this polymer was $M_n=3100$, $M_w=3600$, $M_w/M_n=1.16$.

Example 36

The Preparation of Difunctional poly(NIMMO)

As Example 34 except that a larger amount of oxetane was used in order to generate a higher molecular weight. Thus 60 g oxetane in 240 ml dichloromethane was added over a 48 hour period. Yiled 58 g (96%). The crude product was shown to possess less than 3% oligomer contamination. The molecular weight of this polymer was $M_n=3500$, $M_w=4300$, $M_w/M_n=1.23$.

Example 37

The Preparation of Difunctional poly(NIMMO)-Variation

As Example 36 except that 150 g NIMMO in 600 ml dichloromethane was used. Yield=141 g (94%). The crude product possessed 5% oligomer contamination.

The molecular weight of this polymer was $M_n=8900$, $M_w=11100$; $M_w/M_n=1.25$.

I claim:

1. A process for polymerizing at least one cyclic ether monomer which is capable of oxonium ion cationic polymerization and selected from the group consisting of nitrato-and nitro-substituted oxiranes comprising reacting the monomer with a catalyst and an organic hydroxy-containing precursor compound, the catalyst being capable of generating oxonium ions by reaction with the monomer and the precursor compound having at least one hydroxy functional group for initiating polymerization of the monomer, wherein the polymerization process comprises the steps of:

(a) mixing monomer together with stoichiometric excesses of both the catalyst and the precursor compound to promote formation of said oxonium ions and subsequent reaction between said ions and the hydroxy groups on molecules of the precursor compound to give a non-ionic product having at least one hydroxyl terminal group, the molar ratio of precursor compound to catalyst being at least 5:f where f is the number of hydroxyl functionalities of the precursor compound; and (b) bringing further of the monomer into contact with the reaction mixture at a sufficiently low rate to maintain the catalyst in stoichiometric excess over the monomer such that the non-ionic product of step (a) undergoes chain extension polymerization with further of said oxonium ions, said chain extended polymer having at least one hydroxyl terminal group.

2. The process according to claim 1 wherein each of steps (a) and (b) comprises adding fresh monomer to the reaction mixture at a controlled rate.

3. The process according to claim 2 wherein the duration of steps (a) and (b) is at least 10 hours.

4. The process according to claim 3 wherein the duration of steps (a) and (b) is at least 20 hours.

5. The process according to claim 1 wherein the total amount of monomer reacted in steps (a) and (b) is at least 10:f moles per mole of precursor compound where f is the hydroxy functionality of the precursor compound.

6. The process according to claim 1 wherein the molar ratio of precursor compound to catalyst in step (a) is at least 10:f.

7. The process according to claim 1 including the further steps of (c) allowing the polymerization to proceed substantially to completion, and (d) contacting the reaction mixture with a weak base to neutralize the catalyst.

8. The process according to claim 1 wherein the polymerization is conducted at a temperature of between $-10°$ C. and $+50°$ C.

9. The process according to claim 1 wherein the polymerization is conducted in a $C_1$-$C_2$ chloroalkane solvent.

10. The process according to claim 1 wherein at least one cyclic ether monomer comprises a nitratoalkyl-substituted oxirane.

11. The process according to claim 10 wherein said nitratoalkyl-substituted oxirane is prepared by the reaction of an hydroxyalkyl-substituted oxirane with $N_2O_5$ in an inert organic solvent.

12. The process according to claim 11 wherein the nitratoalkyl-substituted oxirane is prepared and subsequently polymerized in the same $C_1$-$C_2$ chloroalkane solvent.

13. Hydroxy-terminated poly(alkylether) homopolymer or random copolymer of the formula:

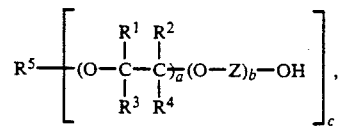

wherein $R^1$ and $R^2$ are independently selected from hydrogen and methyl;

$R^3$ and $R^4$ are independently selected from hydrogen, alkyl containing from 1 to 10 carbon atoms, chloroalkyl and bromoalkyl containing 1 to 2 carbon atoms, azidoalkyl, azidoalkoxyalkyl, fluoronitroalkyl, and fluoronitroalkoxyalkyl containing 1 to 5 carbon atoms, provided at least one of $R^3$ and $R^4$ is nitratoalkyl, nitratoalkoxyalkyl, nitroalkyl or nitroalkoxyalkyl group;

Z is an optionally-substituted alkylene group containing at least three bridging atoms;

a is an integer from 1 to 200;

b is zero or an integer from 1 to 199;

(a+b) is at least 10;

$R^5$ is a residue of an organic hydroxy material which material originally contained from 1 to 6 hydroxyl groups; and c is an integer from 1 to 6.

14. The poly(alkylether) according to claim 13 wherein b is from 1 to 180.

* * * * *